United States Patent
Fortenbaugh et al.

(10) Patent No.: US 9,216,816 B2
(45) Date of Patent: Dec. 22, 2015

(54) PILOT CYCLIC CONTROL MARGIN DISPLAY

(75) Inventors: Robert L. Fortenbaugh, Pantego, TX (US); Frank Conway, Fort Worth, TX (US); Jeffery S. Greenwood, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 376 days.

(21) Appl. No.: 13/699,974

(22) PCT Filed: Jul. 12, 2011

(86) PCT No.: PCT/US2011/043724
§ 371 (c)(1),
(2), (4) Date: Nov. 26, 2012

(87) PCT Pub. No.: WO2013/009303
PCT Pub. Date: Jan. 17, 2013

(65) Prior Publication Data
US 2013/0134255 A1 May 30, 2013

(51) Int. Cl.
*B64C 19/00* (2006.01)
*B64C 13/10* (2006.01)
(Continued)

(52) U.S. Cl.
CPC ............... *B64C 19/00* (2013.01); *B64C 13/10* (2013.01); *G01C 23/005* (2013.01); *G05D 1/0858* (2013.01)

(58) Field of Classification Search
CPC ........ B64C 13/10; B64C 19/00; B64C 27/56; B64C 27/57; B64C 27/006; B64D 43/02; B64D 45/0005; B64D 2045/0085; B64D 2045/001; G01C 23/005; G05D 1/0858; G05D 1/0841; G05D 1/0813; G05D 1/0066

USPC .......... 244/174, 99.13, 17.13, 227, 228, 194, 244/195; 73/178 H
See application file for complete search history.

(56) References Cited

U.S. PATENT DOCUMENTS

| | | | |
|---|---|---|---|
| 5,607,122 A | 3/1997 | Hicks | |
| 5,709,357 A | 1/1998 | von Wilmowsky | |
| 6,070,829 A * | 6/2000 | Bellera et al. | 244/194 |
| 8,195,346 B1 * | 6/2012 | Duerksen et al. | 701/15 |
| 2005/0042094 A1 | 2/2005 | Occhiato | |
| 2008/0275642 A1 | 11/2008 | Clark | |
| 2009/0138142 A1 | 5/2009 | Still | |
| 2010/0017048 A1 * | 1/2010 | Sahasrabudhe et al. | 701/3 |
| 2010/0235019 A1 | 9/2010 | De Bono et al. | |

OTHER PUBLICATIONS

Extended European Search Report dated Aug. 5, 2014 from counterpart EP App. No. 11869308.4.
(Continued)

*Primary Examiner* — Tien Dinh
*Assistant Examiner* — Richard R Green
(74) *Attorney, Agent, or Firm* — James E. Walton; Richard G. Eldredge

(57) ABSTRACT

A system to control flight of an aircraft includes a rotor blade, an actuator operably associated with the rotor blade, a controller operably associated with the actuator, and a flight control system. The flight control system having a subsystem adapted to modify a flight control limit of the aircraft based upon detection of an impending hazardous flight condition and a display showing available flight control limits provided by modification of design control limits based upon the detection of the impending hazardous flight condition. The method includes generating the control limits, modifying the control limits based upon the impending hazardous flight condition, and displaying the displacement of actuator position relative to the displayed control limits thus cueing the pilot as to the cyclic stick or pedal inputs required to increase the control margin from the impending hazardous condition.

15 Claims, 3 Drawing Sheets

(51) Int. Cl.
*G01C 23/00* (2006.01)
*G05D 1/08* (2006.01)

(56) References Cited

OTHER PUBLICATIONS

Internet web page titled "Helicopter—Wikipedia, the free encyclopedia" at internet web address "http://en.wikipedia.org/w/index.php?title=helicopter&oldid=438737819," dated Jul. 10, 2011. Retrieved on Jul. 30, 2014.

International Report on Patentability dated Jan. 14, 2014 from counterpart PCT App. PCT/US2011/043724.
Office Action dated Nov. 25, 2014 from counterpart CA App. No. 2,783,118.
International Search Report and the Written Opinion of the International Searching Authority mailed by ISA/USA, U.S. Patent and Trademark Office on Dec. 14, 2011 for International Patent Application No. PCT/US2011/043724, 8 pages.
Canadian Office Action dated Feb. 17, 2015 from counterpart CA App. No. 2,841,434.

* cited by examiner

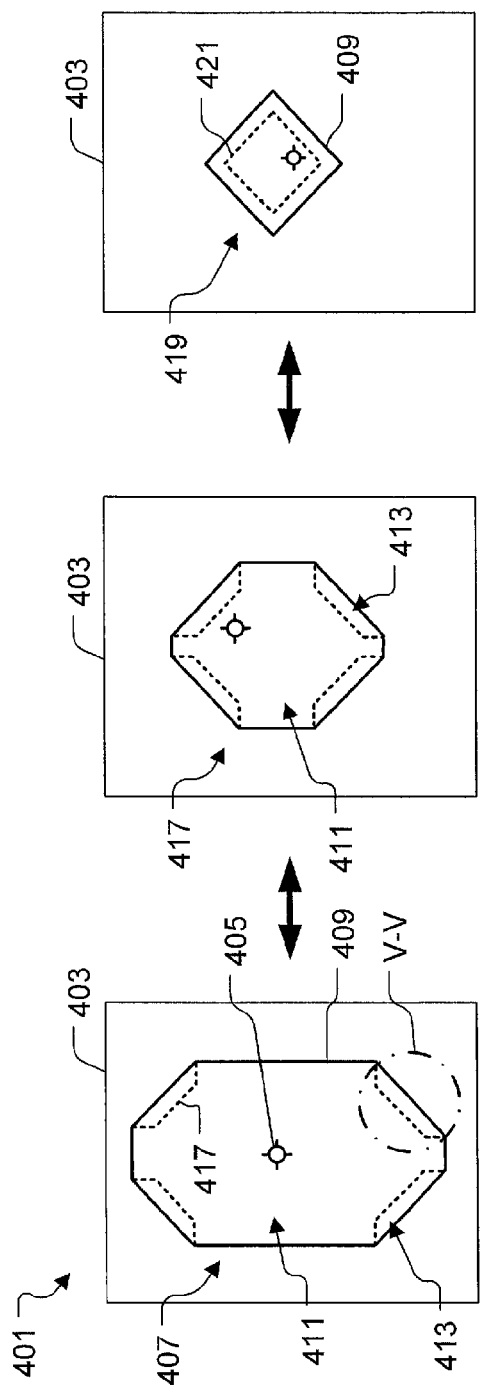
FIG. 4C
FIG. 4B
FIG. 4A
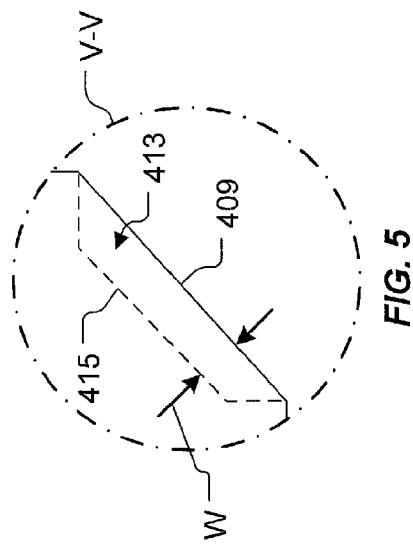
FIG. 5

PILOT CYCLIC CONTROL MARGIN DISPLAY

TECHNICAL FIELD

The present application relates generally to flight control systems, and more specifically, to an aircraft flight control system for rotor blade flapping.

DESCRIPTION OF THE PRIOR ART

All rotor systems are subject to dissymmetry of lift in forward flight. During hover, the lift is equal across the entire rotor disk. As the helicopter gains airspeed, the advancing rotor blade develops greater lift because of the increased airspeed. For example, rotor blades at hover move at 300 knots and in forward flight at 100 knots the advancing blades move at a relative speed of 400 knots and while the retreating blades move at 200 knots. This has to be compensated for in some way, or the helicopter would corkscrew through the air doing faster and faster snap rolls as airspeed increased.

Dissymmetry of lift is compensated for by blade flapping. Because of the increased airspeed (and corresponding lift increase) on the advancing rotor blade, the rotor blade flaps upward. Decreasing speed and lift on the retreating rotor blade causes the blade to flap downward. This induced flow through the rotor system changes the angle of attack on the rotor blades and causes the upward-flapping advancing rotor blade to produce less lift, and the downward-flapping retreating rotor blade to produce a corresponding lift increase. During flapping, the rotor blade exerts a force on the rotor shaft, which in turn can cause the rotor hub to damage nearby aircraft stops.

Conventional devices and methods to control flapping include providing a display showing the longitudinal stick position of the aircraft. In one embodiment, the display is a simple green tape that grows from a center position. Tic marks associated with the display represent 10 percent control margin remaining. Common problems associated with this conventional device include: there is no interface to display the control power remaining before a hazardous condition is reached; and, the directional input to cyclic control is not displayed.

Although the foregoing developments represent great strides in the area of aircraft displays, many shortcomings remain.

BRIEF DESCRIPTION OF THE DRAWINGS

The novel features believed characteristic of the application are set forth in the appended claims. However, the invention itself, as well as a preferred mode of use, and further objectives and advantages thereof, will best be understood with reference to the following detailed description when read in conjunction with the accompanying drawings, wherein:

FIGS. 4A-4C are front views of a display of the control system according to the preferred embodiment of the present application;
FIG. 5 an enlarged view of a portion of the display of FIG. 4A taken at VI-VI.

Figure 1:
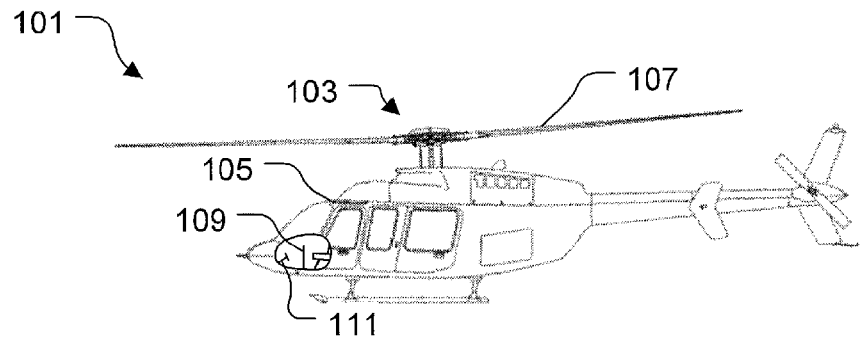
FIG. 1 is a side view of a rotary aircraft.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DESCRIPTION OF THE PREFERRED EMBODIMENT

The system and method of the present application overcomes the abovementioned problems commonly associated with conventional aircraft control systems. The control system comprises a subsystem adapted to modifying predetermined flight control limits for a particular aircraft. The subsystem determines whether the aircraft is operating within or near an impending hazardous flight condition, which, in the exemplary embodiments, are conditions where excessive blade flapping occurs. The control system further comprises a display having a symbol, i.e., a pipper, which identifies displacement of the pilot's cyclic controller combined with pitch control feedbacks and/or pedal displacement and yaw control feedbacks relative to the flight control limits. Further description and illustration of the control system and method is provided in the figures and disclosure below.

It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
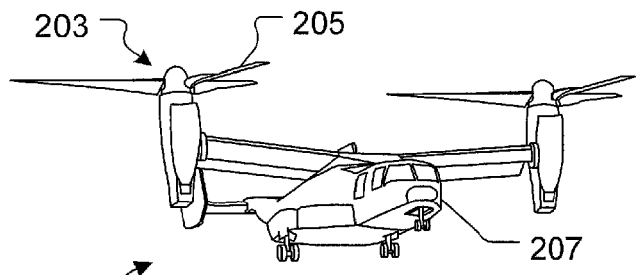
FIG. 2 is an oblique view of a tiltrotor aircraft.

Referring now to the drawings, FIGS. 1 and 2 show two different rotary aircraft utilizing the flight control system of the present application. FIG. 1 shows a side view of a helicopter 101, while FIG. 2 shows an oblique view of a tiltrotor aircraft 201. The flight control system is preferably utilized in tiltrotor aircraft 201 during low speeds and with a fixed lateral cyclic. However, it will be appreciated that the control system is easily and readily adaptable for use with other types of rotary aircraft, i.e., helicopter 101, operating at various speeds and with or without a fixed lateral cyclic controls.

Helicopter 101 comprises a rotary system 103 carried by a fuselage 105. One or more rotor blades 107 operably associated with rotary system 103 provide flight for helicopter 101 and are controlled with a plurality of controllers within fuselage 105. For example, during flight a pilot can manipulate the cyclic controller 109 for changing the pitch angle of rotor blades 107, thus providing lateral and longitudinal flight direction, and/or manipulate pedals 111 for controlling yaw direction. The system of the present application is preferably carried within fuselage 105, thereby providing viewing access to the pilot during flight.

Tiltrotor aircraft 201 includes two or more rotary systems 203 carried by rotatable nacelles. The rotatable nacelles enable aircraft 201 to takeoff and land like a conventional helicopter, thus the rotary systems of tiltrotor 201 are susceptible to excessive flapping of the rotor blades 205 caused by control of the rotor blades, rotor system rotation, and the rotor operating environment such as wind speed and direction. In the preferred embodiment, the control system of the present application is carried within fuselage 207 for assisting the pilot during flight. It should be understood that, like helicopter 101, tiltrotor aircraft 201 comprises a cyclic controller and pedals for manipulating lateral, longitudinal, and yaw control.

For ease of description, some of the required systems and devices operably associated with the present control system are not shown, i.e., sensors, connectors, power sources, mounting supports, circuitry, software, and so forth, in order to clearly depict the novel features of the system. However, it should be understood that the system of the present application is operably associated with these and other required systems and devices for operation, as conventionally known in the art, although not shown in the drawings.

Figure 3A:
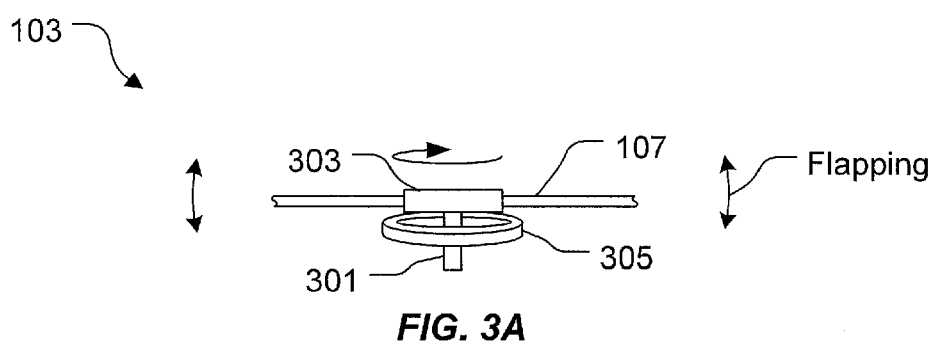
FIGS. 3A and 3B are oblique views of a rotary system.
Figure 3B:
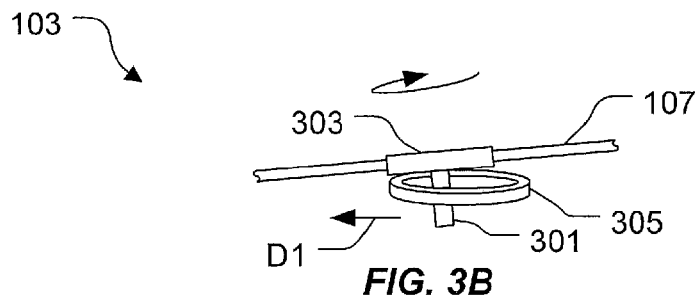

Referring to FIGS. 3A and 3B in the drawings, oblique views of rotary system 103 are shown. FIG. 3A shows rotary system 103 during normal operation, while FIG. 3B shows rotary system 103 during hazardous flight conditions, i.e., the rotary system experiencing excessive flapping. Rotary system 103 comprises a mast 301 rotatably attached to rotor blades 107 via a rotor yoke 303. One or more restraints 305 and/or other nearby structures are positioned alongside mast 301. In the exemplary embodiment, restraints 305 are conventional "stops" adapted to restrain the movement of the hub. It should be understood that both helicopter 101 and tiltrotor 201, along with other types of rotary aircraft, are susceptible to excessive flapping, which could result in damage to the rotary system.

During flight, the rotation of mast 301 combined with the pitching of rotor blades 107 causes flapping, as depicted with vertical arrows. Excessive flapping can cause yoke 303 to move in direction D1, as indicated with the horizontal arrow, which in turn could cause the yoke to come into contact with restraint 305, resulting in damage to components of the rotor system and/or restraint 305, and in some scenarios, resulting in catastrophic failure. It will be appreciated that one of the novel features of the control system of the present application is to assist the pilot in controlling flight of the aircraft to avoid contact between yoke 303 and restraint 305.

Referring now to FIGS. 4A-4C in the drawings, control system 401 according to the preferred embodiment of the present application is shown. System 401 comprises a display 403 for displaying flight control limits on a screen. FIG. 4A shows system 401 during normal flight when certain portions of the design control envelope are limited by a control power management subsystem (CPMS), while FIG. 4C shows the control envelope being morphed as the aircraft approaches hazardous flight conditions. FIG. 4B shows the transition, i.e., morphing of the flight envelope, as the aircraft moves relative to hazardous flight conditions.

Display 403 is provided with a symbol 405, i.e., a pipper, which, in the preferred embodiment, displays displacement of the cyclic controller 109 and pedal 111. In the preferred embodiment, vertical pipper motion on display 403 represents the symmetric cyclic or, equivalently, the displacement of the longitudinal cyclic controller 109, while horizontal pipper motion on the display 403 represents the differential left-right rotor cyclic, or equivalently, control pedal 111. However, it will be appreciated that alternative embodiments of display 403 could easily be adapted to include other flight parameters and/or different controller movement in lieu of the preferred embodiment. For example, system 401 could be adapted to display a symbol indicating movement of both the cyclic lateral and the cyclic longitudinal movement in lieu of the preferred embodiment. Symbol 405 cues the pilot as to the cyclic stick or pedal inputs required to increase the margin from the impending hazardous condition. It should be appreciated that the pipper position in FIG. 4A cues the pilot that left pedal and aft stick will increase the control margin.

It should be understood that display 403 is adapted to display both yaw and pitch control of the aircraft. For example, the vertical axis of display 403 represents the pitch control relative to manipulation of the cyclic controller 109, while the horizontal axis of display 403 represents the aircraft yaw control relative to manipulation of pedal 111. Display 403 provides significant advantages by displaying both yaw and pitch control relative to the control limits.

FIG. 4A shows display 403 having a flight envelope 407 defined by the aircraft control limits 409, represented as a solid line. It should be understood that control limits 409 are either design flight limits established for the particular flight capabilities of the aircraft or limits imposed by the CPMS. For example, other rotary aircraft could include flight control limits having a smaller generally rectangular shape profile in lieu of the larger octagonal shape profile of the preferred embodiment. It should be appreciated that display 403 is adapted to display any flight control limit of the rotary aircraft.

Flight envelope 407 comprises a first region 411, wherein the flight control limits are not modified by CPMS, as will be explained more fully below. Flight envelope 407 further comprises a second region 413, specifically, a total of four of second regions 413 are disposed within region 411. In the exemplary embodiment, region 413 is defined with a dashed line 415. In region 413, the aircraft is operating in or near impending hazardous conditions, i.e., excessive flapping, and the flight control limits are modified by CPMS.

FIG. 4B shows first flight envelope 407 transitioning to a second envelope 417. The morphing of first envelope 407 occurs when the aircraft nears impending hazardous flight conditions. In the second flight envelope 417, region 411 remains unaffected by CPMS. It should be understood that display 403 continuously and interchangeably displays transition between envelopes 407 and 417.

FIG. 4C shows a third flight envelope 419, which is an ultimate shape of display 403 during impending hazardous flight conditions, wherein the entire available control envelope is limited by CPMS. Flight envelope 419 includes a dashed line 421 forming a region therein for cueing the pilot to exercise caution to avoid flight control limits. The region delineates a safe margin for controlling the aircraft without consideration of approaching an unsafe operating condition.

It should be understood that the flight envelopes disclosed herein are generated by the aircraft control limits modified by control limits established by CPMS, which are continuously calculated based upon blade flapping and actuator movement. Thus, the general shape and size of the envelopes vary. For example, in FIG. 5, region 413 is shown having a width W, which increases in length during high blade flapping and decreases in length with low blade flapping. Such features enable the pilot to effectively manipulate the controllers to avoid excessive flapping.

It should also be appreciated that Display 403 continuously transitions between envelopes 407 and 419 depending on the constraints imposed by CPMS, wherein envelope 407 represents minimal CPMS limiting while envelope 419 represents maximal CPMS limiting. It should be understood that FIG. 4B is one of many possible flight envelopes created as the aircraft transitions between normal flight, i.e. first flight envelope 407, to an impending hazardous condition, i.e., third fight envelope 419. It should be noted that the horizontal and vertical lines of flight control limits 409 changes during transitioning between envelopes. For example, a comparison of FIGS. 4A and 4B illustrates flight control limits 409 having a shorter horizontal and vertical length as the flight envelope morphs when the aircraft approaches impending hazardous flight conditions.

Both envelopes 407 and 419 create respective octagonal and diamond geometric shapes in the exemplary embodiments. Of course, it should be appreciated that alternative embodiments could include different geometric shapes depending on the desired limits and depending on the flight characteristics of the aircraft.

Figure 6:
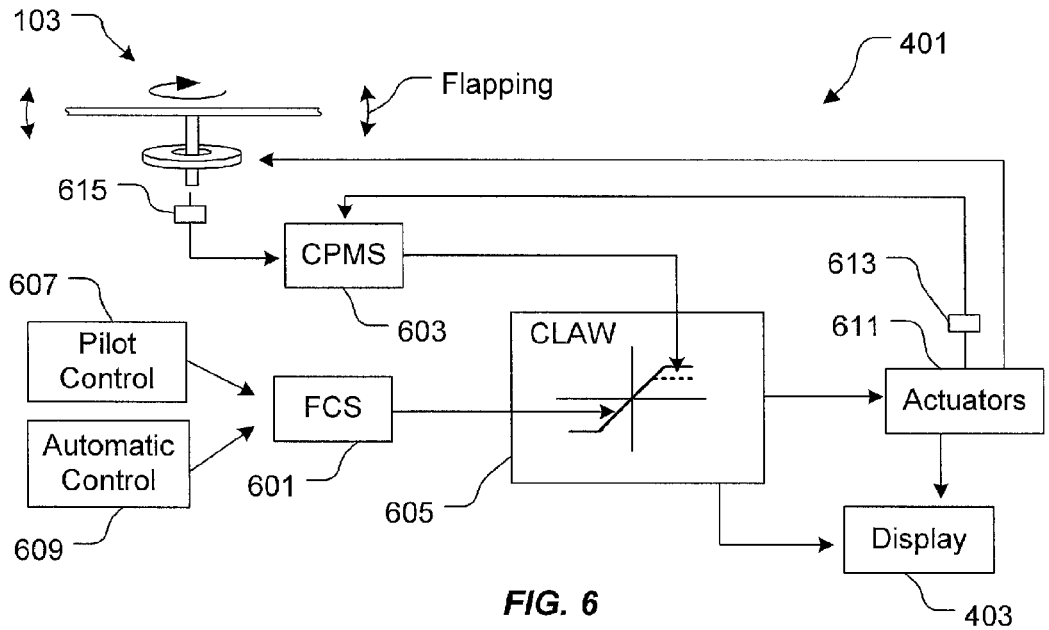
FIG. 6 is a schematic of the flight control system according to the preferred embodiment of the present application.

Referring to FIG. 6 in the drawing, a schematic view of flight control system 401 is shown. System 401 further comprises a flight control subsystem (FCS) 601 and a control power management subsystem 603 (CPMS). Both FCS 601 and CPMS 603 are operably associated with one another to assist the pilot to avoid excessive flapping.

Box 605, labeled as flight control laws (CLAW), depicts the outcome flight control limits generated by both FCS 601 and CPMS 603. As is shown, a solid line represents the original flight control limits, while the dashed line represents the modified flight control limits, i.e., the solid line being lowered with application of CPMS 603. It should be understood that CPMS 603 only limits the flight control limits while the aircraft is flying in or near impending hazardous flight conditions, i.e., excessive blade flapping. The modified flight control limits are thereafter displayed with display 403.

In the preferred embodiment, pilot controller commands 607, i.e., from cyclic controller 109 and/or pedal 111, along with automatic aircraft controls 609, are received by FCS 601, then relayed to aircraft actuators 611. The positioning of the actuators 611 are shown by symbol 405 on display 403.

CPMS 603 is preferably operably associated with a first sensor 613 adapted to sense displacement movement of actuators 611 and a second sensor 615 adapted to sense blade flapping of rotary system 103. CPMS 603 is provided with a flapping limiting algorithm, which receives sensed data from both sensor 613 and sensor 615 to generate control limit envelopes (See, FIGS. 4A-4C). As discussed, the flapping magnitude and actuator displacement changes during flight, thus resulting in changing control limits generated by CPMS 603.

Figure 7:
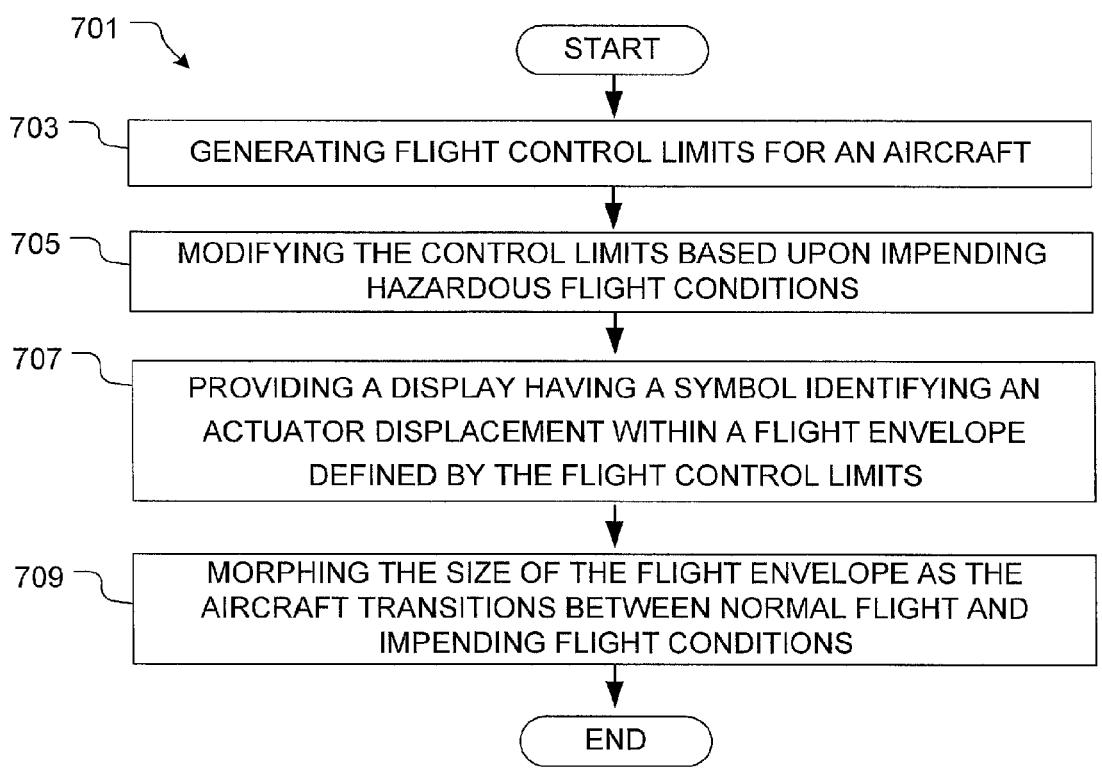
FIG. 7 is a flow chart depicting the preferred method according to the preferred embodiment of the present application.

Referring to FIG. 7 in the drawings, a flowchart 701 depicting the preferred method is shown. Box 703 shows the first step, which includes generating control limits for the aircraft, which are predetermined control limits for the particular aircraft. In the preferred method, both the commanded pilot controls and the automatic aircraft controls are limited by the flight control margins. Box 705 depicts the next step, which includes modifying the control limits to avoid impeding hazardous conditions, i.e., excessive flapping. This step is achieved with CPMS via a flapping limiting algorithm operably associated with the aircraft rotary system and the aircraft actuators. A display is provided to display the flight control envelope defined with the flight control limits, as depicted in box 707. A symbol is also utilized to show the controller displacement relative to the control limits. The next step morphing the envelope as the aircraft approaches impending hazardous flight conditions, as depicted in box 709.

It is apparent that a system and method having significant advantages has been described and illustrated. The particular embodiments disclosed above for a tiltrotor are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present embodiments are shown above, they are not limited to just these embodiments, but are amenable to various changes and modifications without departing from the spirit thereof.

The invention claimed is:

1. A rotary aircraft, comprising:
   a rotor blade;
   an actuator operably associated with the rotor blade, the actuator being configured to change the pitch of the rotor blade;
   a controller operably associated with the actuator; and
   a flight control system, having:
      a subsystem configured to modify a flight control limit of the aircraft based upon detection of an impending hazardous flight condition; and
      a display configured to display a symbol identifying a displacement of the controller relative to the flight control limits, the display showing a flight control envelope configured to morph as the aircraft approaches the impending hazardous flight condition;
      wherein the impending hazardous flight condition is excessive flapping of the rotor blade.

2. The aircraft of claim 1, further comprising:
   a first sensor operably associated with the actuator and the subsystem; and
   a second sensor operably associated with the rotor blade and the subsystem;
   wherein the subsystem utilizes information from the first sensor and the second senor to determine whether an impending hazardous flight condition exists.

3. The aircraft of claim 1, further comprising:
   a pedal controller adapted to control yaw movement of the aircraft;
   wherein the display symbol identifies both a pitch and yaw control displacement.

4. The aircraft of claim 1, wherein the aircraft is a tiltrotor aircraft.

5. The aircraft of claim 1, the flight control envelope comprising:
   a first region; and
   a second region within the first region;
   wherein the first region is configured to depict the control limits unmodified by the subsystem; and
   wherein the second region depicts the control limits modified by the subsystem.

6. The aircraft claim 5, wherein the size of the second region changes upon approaching the impending hazardous flight condition.

7. The aircraft of claim 5, wherein the control limits of the first region and the second region are modified by the subsystem during the impending hazardous flight condition.

8. The aircraft of claim 5, wherein the display shows both a yaw control direction of the aircraft and a cyclic longitudinal control direction of the aircraft.

9. A flight control system for a rotary aircraft, comprising:
   a subsystem configured to modify a flight control limit of the rotary aircraft based upon detection of an impending hazardous flight condition;
   a display configured to display a symbol identifying a displacement of a controller relative to the flight control limits, the display showing a flight control envelope configured to morph as the aircraft approaches the impending hazardous flight condition;

wherein the impending hazardous flight condition is excessive flapping of the rotor blade.

10. The flight control system of claim 9, wherein the controller is a cyclic controller.

11. The flight control system of claim 9, the flight control envelope having:
- a first region; and
- a second region within the first region;
- wherein the first region is configured to depict the control limits unmodified by the subsystem; and
- wherein the second region depicts the control limits modified by the subsystem.

12. The flight control system of claim 11, wherein the second region increases and decreases in area based upon the impending hazardous flight condition.

13. The flight control system of claim 11, wherein the control limits of the first region and the second region are modified by the subsystem during the impending hazardous flight condition.

14. A method, comprising:
- generating flight control limits of an aircraft;
- modifying the control limits based upon impending hazardous flight conditions;
- providing a display having:
  - a symbol identifying an actuator displacement within a flight control envelope defined by the flight control limits;
- morphing the size of the flight control envelope as the aircraft transitions between normal flight and impending hazardous flight conditions;
- measuring flapping of a rotor blade of the rotary aircraft; and
- modifying the control limits based upon the measured flapping;
- wherein excessive flapping of the rotor blade is the impending hazardous flight condition.

15. The method of claim 14, further comprising:
- measuring a displacement movement of an actuator operably associated with the rotor blade; and
- modifying the control limits based upon the measured flapping of the rotor blade and the displacement movement of the actuator.

* * * * *